(12) United States Patent
Raghavan et al.

(10) Patent No.: US 11,621,758 B2
(45) Date of Patent: Apr. 4, 2023

(54) TECHNIQUES FOR DYNAMIC BEAMFORMING MITIGATION OF MILLIMETER WAVE BLOCKAGES

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Raghu Narayan Challa, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/457,896

(22) Filed: Dec. 6, 2021

(65) Prior Publication Data

US 2022/0200676 A1    Jun. 23, 2022

Related U.S. Application Data

(60) Provisional application No. 63/130,227, filed on Dec. 23, 2020.

(51) Int. Cl.
*H04L 1/02*     (2006.01)
*H04B 7/06*     (2006.01)
(Continued)

(52) U.S. Cl.
CPC ......... *H04B 7/0617* (2013.01); *H04B 17/318* (2015.01); *H04B 17/373* (2015.01); *H04B 7/0413* (2013.01)

(58) Field of Classification Search
CPC ...... H04B 7/0617; H04B 7/096; H04B 7/608; H04B 7/0413; H04B 7/088; H04B 7/061;
(Continued)

(56) References Cited

U.S. PATENT DOCUMENTS 10,484,033 B1 * 11/2019 Li ........................... G08B 7/06
2017/0347358 A1   11/2017 Raghavan et al.
(Continued)

FOREIGN PATENT DOCUMENTS

WO   WO-2021142067 A1   7/2021

OTHER PUBLICATIONS

International Search Report and Written Opinion—PCT/US2021/062259—ISA/EPO—dated Apr. 4, 2022.

*Primary Examiner* — Khai Tran
(74) *Attorney, Agent, or Firm* — Dalei Dong; Holland & Hart LLP

(57) ABSTRACT

Methods, systems, and devices for wireless communications are described. A user equipment (UE) may communicate with other network devices as part of a wireless communications system. The UE may identify a blockage corresponding to one or more antenna arrays of a set of antenna arrays based on using a first set of beam weights, which may correspond to a static beamforming codebook of the one or more antenna arrays. The UE may switch from a static beamforming codebook-based beam weight determination to a dynamic beamforming codebook-based beam weight determination. The UE may then determine a second set of beam weights to use for the one or more antenna arrays based on the dynamic beamforming codebook-based beam weight determination. The UE may then communicate using the one or more antenna arrays according to the second set of beam weights.

29 Claims, 10 Drawing Sheets

(51) Int. Cl.
*H04B 17/318* (2015.01)
*H04B 17/373* (2015.01)
*H04B 7/0413* (2017.01)

(58) Field of Classification Search
CPC .. H04B 7/0639; H04B 7/0868; H04B 72/085; H04B 7/0478; H04B 7/0456; H04W 16/23; H04W 36/36; H04L 1/1812
USPC .......................................... 375/267, 260, 262
See application file for complete search history.

(56) References Cited

U.S. PATENT DOCUMENTS

| | | |
|---|---|---|
| 2019/0090143 A1 | 3/2019 | Luo et al. |
| 2019/0222275 A1 | 7/2019 | Mo et al. |
| 2019/0222279 A1 | 7/2019 | Xi et al. |
| 2019/0393944 A1 | 12/2019 | Huang et al. |
| 2020/0076488 A1* | 3/2020 | Brunel .................. H04B 7/063 |

* cited by examiner

TECHNIQUES FOR DYNAMIC BEAMFORMING MITIGATION OF MILLIMETER WAVE BLOCKAGES

CROSS REFERENCE

The present application for patent claims the benefit of U.S. Provisional Patent Application No. 63/130,227 by RAGHAVAN et al., entitled "TECHNIQUES FOR DYNAMIC BEAMFORMING MITIGATION OF MILLIMETER WAVE BLOCKAGES," filed Dec. 23, 2020, assigned to the assignee hereof and hereby incorporated by reference in its entirety.

FIELD OF DISCLOSURE

The present disclosure, for example, relates to wireless communications, more particularly to mitigation techniques of near-field, user-based interference at a user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be equipped with one or more antenna arrays, which the UE may use to transmit and receive wireless signals. The UE may operate according to a beamforming communications configuration, where the antenna arrays may utilize beams that combine and co-phase over a radio-frequency of interest to transmit and receive signals, and communicate with other wireless devices. Objects, such as buildings, vehicles, people, and other obstructions may interfere with communications at the UE. The UE may experience interference at each antenna array differently based on the location and the type of obstruction.

SUMMARY

The described techniques relate to improved methods, systems, devices, and apparatuses that support techniques for dynamic beamforming mitigation of millimeter wave (mmW) blockages. For example, the described techniques provide for a user equipment (UE) to mitigate a blockage (e.g., near-field interference), such as a user's hand or body, by updating beam weights in a beamforming communications system. The UE may identify a blockage corresponding to one or more antenna arrays of a set of antenna arrays based on using a first set of beam weights, which may correspond to a static beamforming codebook of the one or more antenna arrays. The UE may switch from a static beamforming codebook-based beam weight determination to a dynamic beamforming codebook-based beam weight determination based on identifying the blockage. The UE may then determine a second set of beam weights to use for the one or more antenna arrays based on the dynamic beamforming codebook-based beam weight determination. The UE may then communicate using the one or more antenna arrays according to the second set of beam weights.

A method for wireless communications at a UE is described. The method may include identifying a blockage corresponding to one or more antenna arrays of multiple antenna arrays based on using a first set of beam weights corresponding to a static beamforming codebook of the one or more antenna arrays, switching from a static beamforming codebook-based beam weight determination to a dynamic beamforming codebook-based beam weight determination, determining a second set of beam weights to use for the one or more antenna arrays based on the dynamic beamforming codebook-based beam weight determination, and communicating using the one or more antenna arrays according to the second set of beam weights.

An apparatus for wireless communications at a UE is described. The apparatus may include a processor, memory in electronic communication with the processor, and instructions stored in the memory. The instructions may be executable by the processor to cause the apparatus to identify a blockage corresponding to one or more antenna arrays of multiple antenna arrays based on using a first set of beam weights corresponding to a static beamforming codebook of the one or more antenna arrays, switch from a static beamforming codebook-based beam weight determination to a dynamic beamforming codebook-based beam weight determination, determine a second set of beam weights to use for the one or more antenna arrays based on the dynamic beamforming codebook-based beam weight determination, and communicate using the one or more antenna arrays according to the second set of beam weights.

Another apparatus for wireless communications at a UE is described. The apparatus may include means for identifying a blockage corresponding to one or more antenna arrays of multiple antenna arrays based on using a first set of beam weights corresponding to a static beamforming codebook of the one or more antenna arrays, means for switching from a static beamforming codebook-based beam weight determination to a dynamic beamforming codebook-based beam weight determination, means for determining a second set of beam weights to use for the one or more antenna arrays based on the dynamic beamforming codebook-based beam weight determination, and means for communicating using the one or more antenna arrays according to the second set of beam weights.

A non-transitory computer-readable medium storing code for wireless communications at a UE is described. The code may include instructions executable by a processor to identify a blockage corresponding to one or more antenna arrays of multiple antenna arrays based on using a first set of beam weights corresponding to a static beamforming codebook of the one or more antenna arrays, switch from a static beamforming codebook-based beam weight determination to a dynamic beamforming codebook-based beam weight determination, determine a second set of beam weights to use for the one or more antenna arrays based on the dynamic beamforming codebook-based beam weight determination, and communicate using the one or more antenna arrays according to the second set of beam weights.

Some examples of the method, apparatuses, and non-transitory computer-readable medium described herein may further include operations, features, means, or instructions for measuring one or more channel conditions using a set of aperiodic channel state information reference signal (CSI-RS) symbols, where determining the second set of beam weights may be based on measuring the one or more channel conditions.

Some examples of the method, apparatuses, and non-transitory computer-readable medium described herein may further include operations, features, means, or instructions for selecting a subset of the set of aperiodic CSI-RS symbols based on a dynamic beamforming codebook associated with the dynamic beamforming codebook-based beam weight determination and estimating one or more beam weights corresponding to each aperiodic CSI-RS symbols of the subset, where determining the second set of beam weights may be based on the estimated one or more beam weights.

In some examples of the method, apparatuses, and non-transitory computer-readable medium described herein, estimating the one or more beam weights may include operations, features, means, or instructions for estimating a signal strength of the subset of aperiodic CSI-RS symbols and determining a set of beam directions based on the estimated signal strength.

Some examples of the method, apparatuses, and non-transitory computer-readable medium described herein may further include operations, features, means, or instructions for estimating a phase shift of the one or more beam weights based on the subset of aperiodic CSI-RS symbols, where estimating the one or more beam weights may be based on estimating the phase shift.

Some examples of the method, apparatuses, and non-transitory computer-readable medium described herein may further include operations, features, means, or instructions for estimating an amplitude control adaptation of the one or more beam weights based on the subset of aperiodic CSI-RS symbols, where estimating the one or more beam weights may be based on estimating the amplitude control adaptation.

In some examples of the method, apparatuses, and non-transitory computer-readable medium described herein, the dynamic beamforming codebook corresponds to a fixed set of phase shifter and amplitude control adaptations that may be loaded from a slow memory of the UE, and a quantity of the amplitude control adaptations satisfy a second threshold level of a size of the one or more antenna arrays.

In some examples of the method, apparatuses, and non-transitory computer-readable medium described herein, the set of aperiodic CSI-RS symbols may be based on an allocation by a base station.

Some examples of the method, apparatuses, and non-transitory computer-readable medium described herein may further include operations, features, means, or instructions for transmitting a request for a number and location of aperiodic CSI-RS symbols and receiving the set of aperiodic CSI-RS symbols, where measuring the one or more channel conditions may be based on receiving the set of aperiodic CSI-RS symbols.

In some examples of the method, apparatuses, and non-transitory computer-readable medium described herein, detecting, by one or more sensors, a condition of an environment, where identifying the blockage may be based on detecting the condition using the one or more sensors.

In some examples of the method, apparatuses, and non-transitory computer-readable medium described herein, the one or more sensors include a radar sensor, a frequency modulated continuous wave (FMCW) radar sensor, a light detection and ranging (LIDAR) sensor, an accelerometer, a tachometer, a proximity sensor, a gyroscope, a magnetometer, a light sensor, a touch sensor, or a combination thereof.

In some examples of the method, apparatuses, and non-transitory computer-readable medium described herein, the blockage may be a hand of a user or body holding the UE.

Some examples of the method, apparatuses, and non-transitory computer-readable medium described herein may further include operations, features, means, or instructions for performing a machine learning analysis of one or more conditions in an environment, where identifying the blockage may be based on performing the machine learning analysis by accumulating a history of at least one of beam management reports including transmission configuration indicator (TCI) states and associated reference signal received powers (RSRPs), UE feedback on channel quality indicator (CQI), rank indicator (RI) and precoding matrix indicator (PMI) used at a base station, base station messages, or hybrid automatic repeat request (HARQ) messages, or a combination thereof.

Some examples of the method, apparatuses, and non-transitory computer-readable medium described herein may further include operations, features, means, or instructions for applying the determined second set of beam weights to the multiple antenna arrays based on the dynamic beamforming codebook-based beam weight determination.

Some examples of the method, apparatuses, and non-transitory computer-readable medium described herein may further include operations, features, means, or instructions for determining that a signal strength associated with the one or more antenna arrays satisfies a signal strength threshold, where identifying the blockage may be based on determining that the signal strength satisfies the signal strength threshold and transmitting a request to receive one or more aperiodic CSI-RS symbols based on the determining.

In some examples of the method, apparatuses, and non-transitory computer-readable medium described herein, the signal strength threshold includes a RSRP corresponding to the first set of beam weights.

In some examples of the method, apparatuses, and non-transitory computer-readable medium described herein, the static beamforming codebook corresponds to a fixed set of phase shifter and amplitude control adaptations that may be based on a fast memory of the UE, and a quantity of the amplitude control adaptations satisfy a first threshold level of a size of the one or more antenna arrays.

In some examples of the method, apparatuses, and non-transitory computer-readable medium described herein, the UE operates in a mmW radio frequency spectrum band greater than 24.25 gigahertz (GHz).

DETAILED DESCRIPTION

Figure 1:
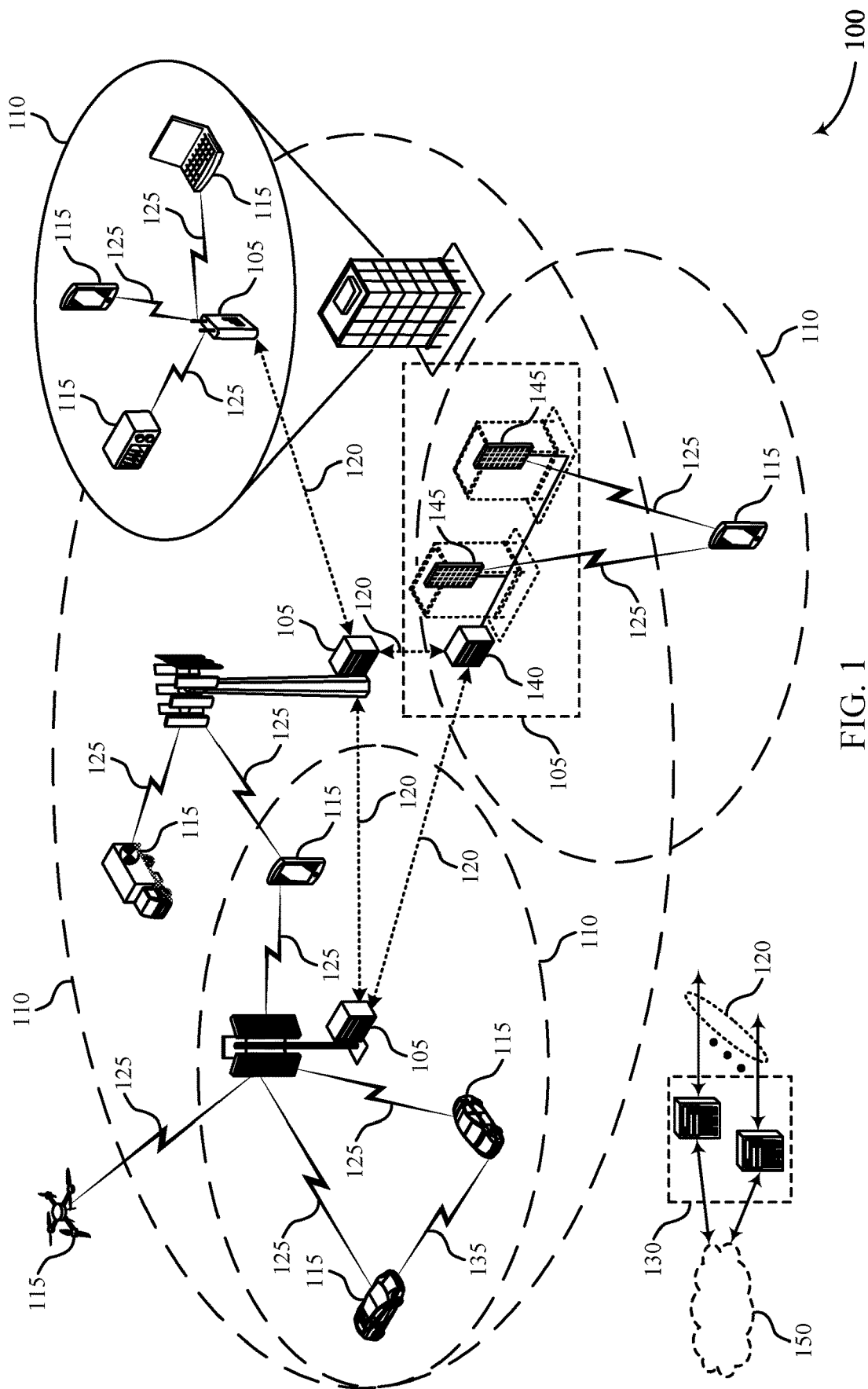
FIG. 1 illustrates an example of a wireless communications system that supports techniques for dynamic beamforming mitigation of millimeter wave (mmW) blockages in accordance with various aspects of the present disclosure.

A user equipment (UE) may communicate in a wireless communications system with one or more other devices. The UE may communicate with a base station, or another network component, by transmitting uplink communications to the base station and receiving downlink communications from the base station. The UE may also communicate with other UEs, such as in a vehicle-to-vehicle (V2V) or vehicle to everything (V2X) communications system, which may be an example of a sidelink communications system.

A UE may communicate using a set of antenna arrays based on a beamforming communications procedure (whether using downlink, uplink, or sidelink communications). Each antenna array may be excited with a set of beams from a static beamforming codebook. Beamforming, which may also be referred to as spatial filtering, directional transmission, or directional reception, is a signal processing technique that may be used at a UE to shape or steer an antenna beam along a spatial path between the UE and a receiving device, such as a base station or another UE. The UE may utilize transmit beams and receive beams. The UE may transmit signals using transmit beams, which may be received by receive beams of other devices.

As the beams correspond to different antenna arrays of the UE, interference with the antenna arrays may impact transmission and reception of beams of the UE. A beam may be blocked by obstructions in the vicinity of the UE (e.g., near-field interference) or remote obstructions (e.g., far-field interference), or the UE may experience interference from other wireless communications. For example, a hand of a user holding the UE may be an example of an obstruction in the vicinity of the UE that may interfere with the transmission beams and the reception of beams of the UE. The UE may perform beam quality measurements, and, in the case of a low quality measurement, the UE may take steps to adjust a beam, switch beams, or otherwise respond to mitigate potential interference.

One case of obstruction in the vicinity of the UE may be a user of a UE. For example, when operating a UE, a user's hand or body may partially or entirely cover one or more sets of antenna arrays of a UE. The hand may thus be an example of near-field interference, which may reduce the communications quality with the UE. In some examples, blockage from a hand may cause significant levels of interference (e.g., 2-20 dB, or more depending of the grip of the hand, properties of the hand, a number of antenna elements in the antenna array, or other parameters), based on the angle of the antenna component relative to the position of the hand. In order to mitigate interference, the UE may determine to switch antenna arrays (e.g., antenna components or panels), or switch beams within an antenna panel. For example, a UE may switch beams in cases where latency from beam switching is low, relative to the time during which data disruption may be acceptable. Low latency beam switching may depend on a quality of UE hardware, and when associated radio-frequency and beam switching latencies are possible. Further, beam switching may cause additional overhead in control channel communications. Thus, there may be some cases where beam switching may cause latency and overhead, which may decrease efficiency.

In some cases, a UE may instead update beam weights of the beamforming communication configuration. A UE may use one or more sensors to sense the interference (e.g., the hand close to the UE). For example, the sensors may include frequency-modulated continuous-wave (FMCW) radar or a light detection and ranging (LIDAR) sensor, which may sense a hand or fingers around or near an antenna array. The UE may measure quality of beams of an antenna array, and the UE may determine that beam quality has fallen below a threshold. Based on the decrease in beam quality and the sensor data identifying a blockage (e.g., a hand near the UE), a UE may determine to estimate new beam weights to apply to the one or more antenna arrays. The estimation of the new beam weights may be based on a dynamic codebook-based beam weight determination, which may include additional estimations of parameters such as phase shifter and amplitude control settings that may be different from the phase shifter and amplitude control settings with a static codebook-based beam weight determination.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to techniques for dynamic beamforming mitigation of millimeter wave (mmW) blockages.

FIG. 1 illustrates an example of a wireless communications system 100 that supports techniques for dynamic beamforming mitigation of mmW blockages in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical)

communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a respective bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a respective radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a respective carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or radio frequency spectrum band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands, may be in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a respective orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a respective receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may mitigate near-field interference, such as a user's hand or body, by updating beam weights in a beamforming communications system. The UE 115 may identify a blockage corresponding to one or more antenna arrays of a set of antenna arrays based on using a first set of beam weights. The first set of beam weights of the one or more antenna arrays may have been determined using a static beamforming codebook. The UE 115 may switch from a static beamforming codebook-based beam weight determination to a dynamic beamforming codebook-based beam weight determination based on identifying the blockage. The UE 115 may then determine a second set of beam weights to use for the one or more antenna arrays based on the dynamic beamforming codebook-based beam weight determination. The UE 115 may then communicate using the one or more antenna arrays according to the second set of beam weights.

Figure 2:
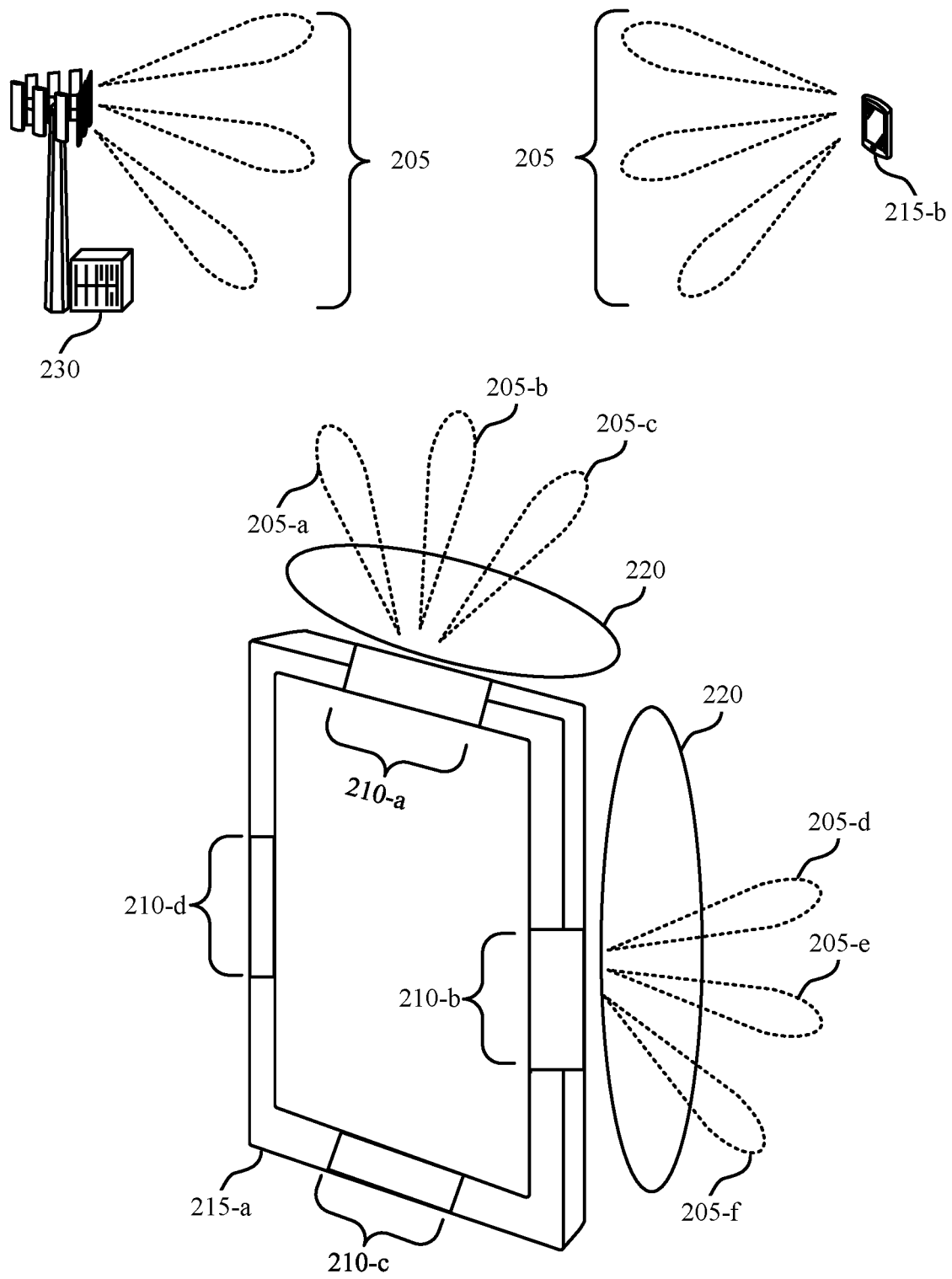
FIG. 2 illustrates an example of a wireless communications system that supports techniques for dynamic beamforming mitigation of mmW blockages in accordance with various aspects of the present disclosure.

FIG. 2 illustrates an example of a wireless communications system 200 that supports techniques for dynamic beamforming mitigation of mmW blockages in accordance with various aspects of the present disclosure. UE 215-*a* and UE 215-*b* may communicate with each other UE 215 and with base station 230 as described with respect to FIG. 1. UEs 215 may be examples of UEs 115 as described with respect to FIG. 1. Base station 230 may be an example of base station 105 as described with respect to FIG. 1. UE 215-*a* may include antenna array 210-*a*, antenna array 210-*b*, antenna array 210-*c*, and antenna array 210-*d*. Each of antenna arrays 210 may transmit and receive communications using beams 205. For example, Antenna array 210-*a* may communicate using beam 205-*a*, beam 205-*b*, and beam 205-*c*. Antenna array 210-*b* may communicate using beam 205-*d*, beam 205-*e*, and beam 205-*f*.

In some cases, UE 215-*a* may communicate with base station 230 by transmitting uplink communications to base station 230 using beams 205, and receiving downlink communications from base station 230 using beams 205. In some cases, UE 215-*a* may communicate with UE 215-*b* by transmitting and receiving sidelink communications using beams 205 and the techniques described herein may be applied to sidelink communications. UE 215-*a*, UE 215-*b*, and base station 230 may communicate in different radio frequency spectrum bands, including mmW and sub-6 GHz radio frequency spectrum bands, which may include frequency range 2 (FR2) ranging from 24.25 GHz to 52.6 GHz, and frequency range 4 (FR4) ranging from 52.6 GHz to 114-0.25 GHz, and sub-Terahertz (THz) frequencies (which may cover 114.25 to 300 GHz). Base station 230 and UE 215-*b* may also communicate by transmitting and receiving using sets of transmit and receive beams 205. A beam 205 may operate according to a pair of beam weights, where each beam weight corresponds to the use of a phase-shifter and amplitude control setting that may excited one polarization of a two-layer MIMO polarization-based transmissions procedure. The beams 205 may also be associated with a polarization parameter, an orbital angular momentum parameter, or a spin-based parameter. Each of these parameters may be altered to increase transmit and receive diversity of a set of beams 205.

A blockage 220 may interfere with communications to and from UE 215-*a*, by interfering with transmissions and receptions to and from antenna array 210-*a*. The blockage 220 may be an example of a user's hand holding the UE 215-*a*. UE 215-*a* may identify that blockage 220 is user's hand. For example, UE 215-*a* may sense the presence of blockage 220 using one or more of a FMCW radar, a LIDAR sensor, an accelerometer, a tachometer, a proximity sensor, a gyroscope, a light sensor, a touch sensor, or other sensors. In some cases, UE 215-*a* may utilize machine learning analysis to determine the presence and type (e.g., a hand) of blockage 220. The machine learning analysis may be based on a historical data analysis of previous blockages, type of blockages, measured signal and interference levels, and measurements by the sensors described herein. The machine learning analysis may also be based on an accumulated history of transmission configuration indicator (TCI) states, associated reference signal receive power (RSRP) measurements, channel quality indicator (CQI), rank indicator (RI), precoding matrix indicator (PMI) to be used at base station 230, base station control and data signaling to UE 215-*a*, HARQ signaling, or a combination of these.

Thus, UE 215-*a* may identify blockage 220. UE 215-*a* may also measure quality metrics of each of beam 205-*a*, beam 205-*b*, and beam 205-*c*. The quality measurements may include one or more of reference RSRP measurements, reference signal receive quality (RSRQ) measurements, signal to noise ratio (SNR) measurements, signal to interference plus noise ratio (SINR) measurements, and other types of quality measurements. UE 215-*a* may also measure or record a beam pattern (e.g., beam width beam steering direction, side-lobe levels, and other parameters). Based on the measurements, UE 215-*a* may determine that the signal quality of one or more of beam 205-*a*, beam 205-*b*, and beam 205-*c* may satisfy a signal strength threshold (e.g., a low quality threshold) which may indicate that interference is significant, or at an impactful or debilitating level. The signal strength threshold may indicate that beam change or a different antenna component or a different transmission reception point (TRP) may be used. There also may be scenarios where such changes may be precluded. Thus, based on the determination that the blockage 220 is a hand (or another type of near-field interference), UE 215-*a* may determine to estimate beam weights rather than perform a beam or antenna array or TRP switch.

The beam weight estimation process may include a switch from a static codebook-based beam weight determination procedure to a dynamic codebook-based beam weight determination procedure. In a static codebook, a potential set of beam weights may be small (e.g., below a first threshold that may be a function of the number of antenna elements in the antenna array). In a dynamic codebook, a potential set of beam weights may be large (e.g., above a second threshold that may be a function of the number of antenna elements in the antenna array). In the dynamic codebook beam weight determination procedure, UE 215-*a* may request a number of aperiodic CSI-RS symbols from the network (e.g., from base station 230 or from UE 215-*b*). In some cases, UE 215-*a* may identify a set of allocated periodic CSI-RS symbols (e.g., periodic CSI-RS symbols that were previously allocated by a base station). In some cases, the UE 215-*a* may use reference signals already received or scheduled to be received to determine beam weights, rather than request additional reference signals.

UE 215-*a* may receive or identify the set of symbols, and make an estimate of adaptive beam weights based on the measurements over the set of symbols. The dynamic beam weights used may include estimates of phase shifter and amplitude control adaptations. UE 215-*a* may select a subset of the CSI-RS symbols (either periodic or aperiodic) to determine the beam weights from the dynamic codebook according to the dynamic codebook beam weight estimation process.

The dynamic codebook operations may correspond to a first set of phase shifter and amplitude control adaptations that may be loaded from the slow memory of UE 215-*a*. A quantity of the amplitude control adaptations may satisfy a threshold level of a size of the one or more antenna arrays 210. The dynamic codebook operations may thus differ from static codebook operations, as the static beamforming codebook may correspond to a fixed set of phase shifter and amplitude control adaptations that may be based on a fast memory of UE 215-*a*, and the quantity of the static codebook adaptations may satisfy a threshold level of a size of the one or more antenna arrays 210, where the threshold level of the static codebook may be lower than the threshold level of the dynamic codebook.

For example, with a 4×1 antenna array, a static codebook could be the set of phase shifter and amplitude control settings (beam weights) that may steer energy towards a finite number (e.g., 4 or 8) of unique directions over a specific coverage area (e.g., 90°-120° around the boresight direction). A dynamic codebook may include a consideration of equal amplitudes, where phase shifter settings may come from a B=2 bit phase shifter. In some cases, a $2^B=4$ phase shifter possibilities may exist for each antenna element and, for example, 3 unique antenna element-based phase shifter settings may be used from a beamforming perspective. In these cases, the dynamic codebook may be of size $(2^B)^3=64$. Thus, in this dynamic codebook setting, the first threshold may be 8 (e.g., the static codebook threshold) and the second threshold may be 60 (e.g., the dynamic codebook threshold). Thus, in this example, the static codebook may be a small codebook, whereas the dynamic codebook may be a large codebook.

The estimated phase shifter and amplitude control may address interference that may be unique to a hand blockage, and associated signal skewing by the hand. For example, fingers in the hand in blockage 220 may irregularly reflect energy along different directions, which may be mitigated by adjusting phase shifter and amplitude of beams accordingly. Thus, the estimation of phase shifter and amplitude settings may tailor the beam 205-*a*, beam 205-*b*, and beam 205-*c* for the case of a hand acting as the blockage 220. As the skewing caused by a hand acting as the blockage 220 may be more unpredictable than interference and reflections caused by non-organic or other obstructions, the phase changes, phase shifters, and amplitudes may be adjusted dynamically to efficiently mitigate the interference.

UE 215-*a* may the apply the updated beam weight estimates (e.g., phase shifters and amplitude control parameters) to one or more of beam 205-*a*, beam 205-*b*, or beam 205-*c* of antenna array 210-*a*. In some cases, UE 215-*a* may perform a similar beam weight estimation for antenna array 210-*b*, antenna array 210-*c*, and antenna array 210-*d*, and may also update the corresponding beams accordingly. For example, UE 215-*a* may adjust beam weights of beam 205-*d*, beam 205-*e*, and beam 205-*f* of antenna array 210-*b* may on the same blockage 220, or based on a different blockage.

In other cases, blockage 220 may be an example of a different type of near-field interference, or an example of far-field interference, such as a building. UE 215-*a* may similarly use a dynamic codebook process to estimate and update beam weights for other types of near-field and far-field interference.

A dynamic codebook-based approach may be detected by measuring beam patterns of a UE 215 before and after a blockage. A beam lock operation may be performed with the UE 215, which may cause the active antenna module to be locked. The beam pattern of the UE 215 may be measured when a hand is covering the UE 215. The beam pattern measurement may measure the beam pattern distortion of a serving beam from the static beam codebook. The test may reveal performance loss caused by the hand blockage.

The beam lock operation may be removed, and the antenna module lock may be maintained, with the hand on the UE 215. The UE 215 may perform a beamforming solution to mitigate the interference, and the beam pattern may be measured again based on an updated serving beam. If the beam pattern has a modified beam weight, and the performance loss is mitigated, then a dynamic codebook may be being used by the UE 215.

Figure 3:
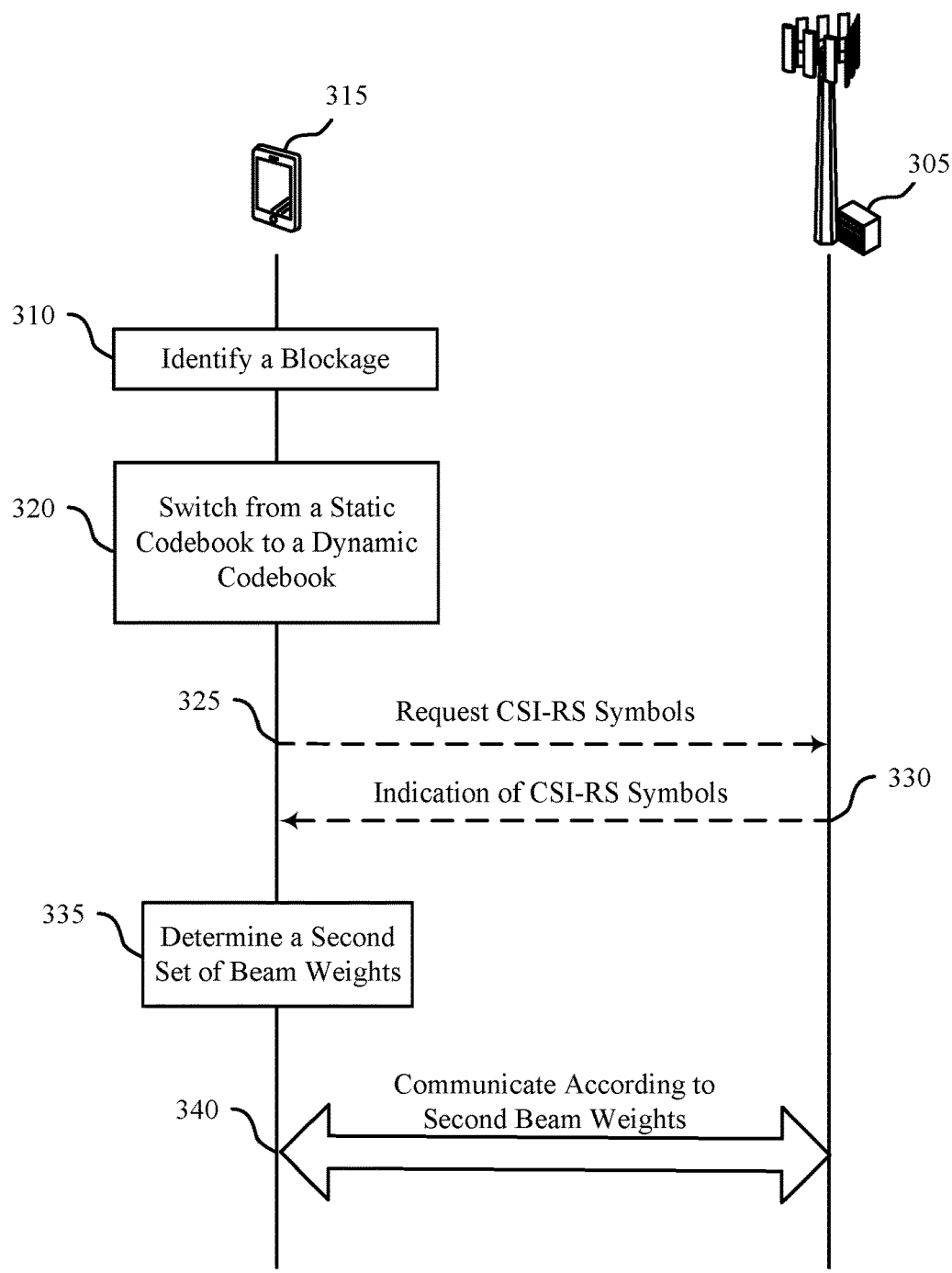
FIG. 3 illustrates an example of a process flow that supports techniques for dynamic beamforming mitigation of mmW blockages in accordance with various aspects of the present disclosure.

FIG. 3 illustrates an example of a process flow 300 that supports techniques for dynamic beamforming mitigation of mmW blockages in accordance with various aspects of the present disclosure. Process flow 300 may include UE 315, which may be an example of a UE 115 or a UE 215 as described with respect to wireless communications system 100 and wireless communications system 200, respectively. Process flow 300 also includes a base station 305, which may be an example of a base station 105 or a base station 230 as described with respect to wireless communications system 100 and wireless communications system 200, respectively. Base station 305 may also be a second UE 315. UE 315 may operate in a mmW radio frequency spectrum band greater than 24.25 gigahertz. Although described in the context of mmW radio frequency spectrum bands, it is to be understood that the techniques described herein may also be applicable to other radio frequency spectrum bands, such as upper mmW radio frequency spectrum bands, sub-THz radio frequency spectrum bands, SHF radio frequency spectrum bands, or EHF radio frequency spectrum bands, among other examples.

At 310, UE 315 may identify a blockage corresponding to one or more antenna arrays of a set of antenna arrays, based on using a first set of beam weight corresponding to a static beamforming codebook of the one or more antenna arrays. UE 315 may detect, by one or more sensors, a condition of an environment. UE 315 may identify the blockage based on detecting the condition using the one or more sensors. The one or more sensors may include a radar sensor, a FMCW radar sensor, a LIDAR sensor, an accelerometer, a tachometer, a proximity sensor, a gyroscope, a magnetometer, a light sensor, a touch sensor, or a combination of these. In some cases, UE 315 may determine that the blockage is a hand or body of a user holding the UE 315. In other cases, UE 315 may determine that the blockage is not a hand or body-induced blockage. For example, if UE 315 is placed on a table, materials of the table may distort electric fields around UE 315. Thus, UE 315 may identify the table as a blockage based on detecting conditions (e.g., distorted electric fields) associated with the table.

The static beamforming codebook may correspond to a fixed set of phase shifter and amplitude control adaptations that may be based on a fast memory of the UE 315. A quantity of the amplitude control adaptations may satisfy a first threshold level of a size of the one or more antenna arrays.

In some cases, UE 315 may perform a machine learning analysis of one or more conditions in an environment. UE 315 may thus identify the blockage is based on performing the machine learning analysis on an accumulated history of at least one of beam management reports including TCI states and associated RSRPs, UE feedback on CQI, RI, and PMI used at base station 305, base station 305 messages, or HARQ messages, or a combination thereof.

UE 315 may determine that a signal strength associated with the one or more antenna arrays satisfies a signal strength threshold. UE 315 may identify the blockage based on determining that the signal strength satisfies the signal strength threshold. In some cases, UE 315 may transmit a request to receive one or more aperiodic CSI-RS symbols based on the determining. The signal strength threshold may be a RSRP corresponding to the first set of beam weights.

At 320, UE 315 may switch from a static beamforming codebook-based beam weight determination to a dynamic beamforming codebook-based beam weight determination. UE 315 may measure one or more channel conditions using a set of aperiodic CSI-RS symbols, where determining the second set of beam weights is based on measuring the one or more channel conditions.

In some cases, UE 315 may transmit, at 325, a request for a number and location of aperiodic CSI-RS symbols. At 330, UE 315 may receive the set of aperiodic CSI-RS symbols, where measuring the one or more channel conditions may be based on receiving the set of aperiodic CSI-RS symbols. In other cases, the set of aperiodic CSI-RS symbols may be based on an allocation by base station 305.

UE 315 may then select a subset of the set of aperiodic CS-RS symbols based on a dynamic beamforming codebook associated with the dynamic beamforming codebook-based beam weight determination. The beam weights from a dynamic beamforming codebook may correspond to a fixed set of phase shifter and amplitude control adaptations that may be loaded from a slow memory of the UE 315. A quantity of the amplitude control adaptations may satisfy a second threshold level of a size of the one or more antenna arrays. UE 315 may then estimate one or more beam weights corresponding to each aperiodic CSI-RS symbols of the subset, where determining the second set of beam weights is based on the estimated one or more beam weights.

UE 315 may estimate the beam weight based on estimating a signal strength of the subset of aperiodic CSI-RS symbols. UE 315 may then determine a set of beam directions based on the estimated signal strength. The beam weight estimation may include UE 315 estimating a phase shift of the one or more beam weights based on the subset of aperiodic CSI-RS symbols, where estimating the one or more beam weights may be based on estimating the phase shift. UE 315 may also estimate an amplitude control adaptation of the one or more beam weights based on the subset of aperiodic CSI-RS symbols, where estimating the one or more beam weights may be based on estimating the amplitude control adaptation.

At 335, UE 315 may determine a second set of beam weights to use for the one or more antenna arrays based on the dynamic beamforming codebook-based beam weight determination. UE 315 may apply the determined second set of beam weights to the set of antenna arrays based on the dynamic beamforming codebook-based beam weight determination. At 340, UE 315 may communicate using the one or more antenna arrays according to the second set of beam weights.

Figure 4:
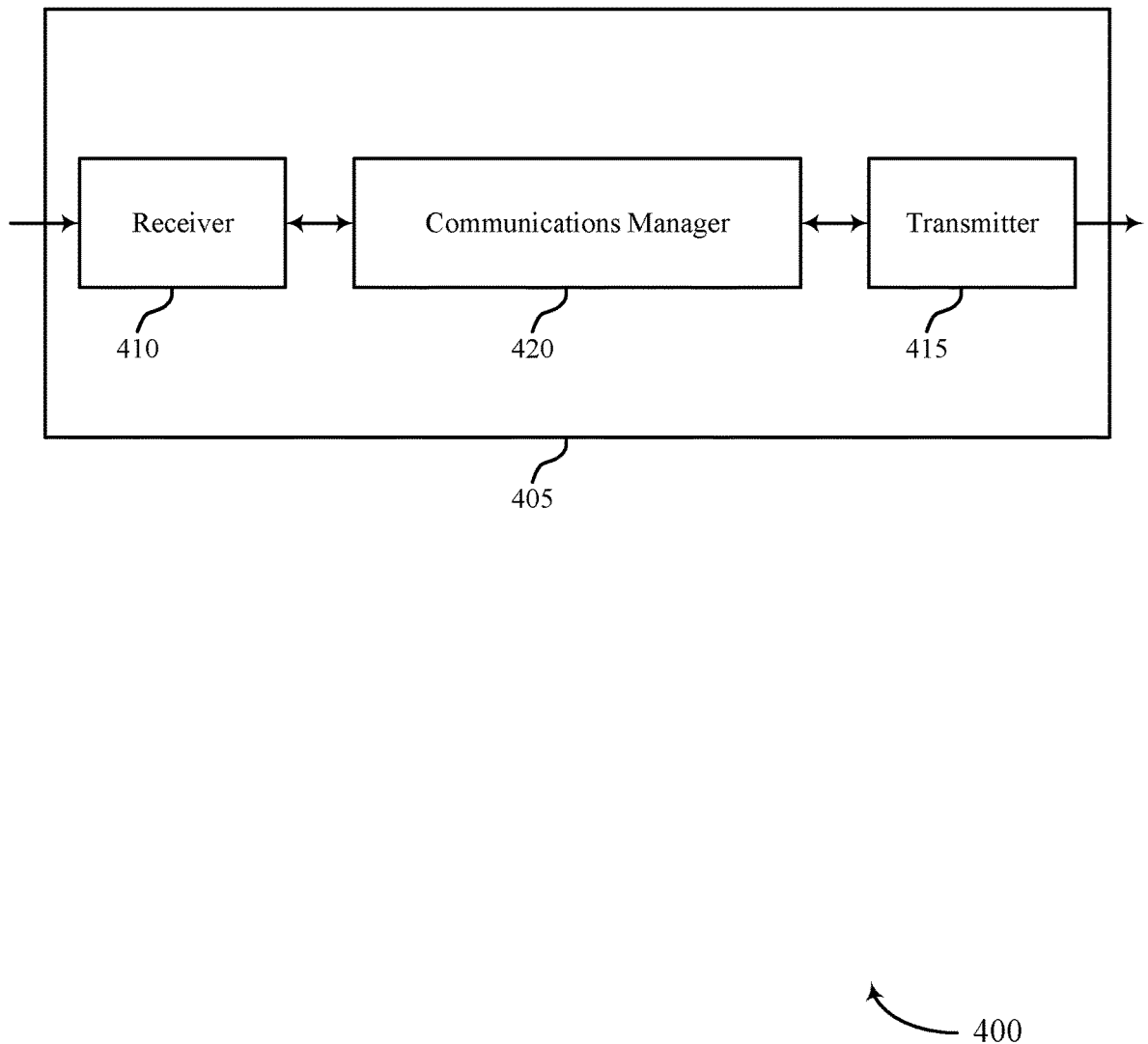
FIG. 4 shows a block diagram of a device that supports techniques for dynamic beamforming mitigation of mmW blockages in accordance with various aspects of the present disclosure.

FIG. 4 shows a block diagram 400 of a device 405 that supports techniques for dynamic beamforming mitigation of mmW blockages in accordance with various aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for dynamic beamforming mitigation of mmW blockages). Information may be passed on to other components of the device 405. The receiver 410 may utilize a single antenna or multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for dynamic beamforming mitigation of mmW blockages). In some examples, the transmitter 415 may be co-located with a receiver 410 in a transceiver component. The transmitter 415 may utilize a single antenna or multiple antennas.

The communications manager 420, the receiver 410, the transmitter 415, or various combinations thereof or various components thereof may be examples of means for performing various aspects of techniques for dynamic beamforming mitigation of mmW blockages as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for identifying a blockage corresponding to one or more antenna arrays of multiple antenna arrays based on using a first set of beam weights corresponding to a static beamforming codebook of the one or more antenna arrays. The communications manager 420 may be configured as or otherwise support a means for switching from a static beamforming codebook-based beam weight determination to a dynamic beamforming codebook-based beam weight determination. The communications manager 420 may be configured as or otherwise support a means for determining a second set of beam weights to use for the one or more antenna arrays based on the dynamic beamforming codebook-based beam weight determination. The communications manager 420 may be configured as or otherwise support a means for communicating using the one or more antenna arrays according to the second set of beam weights.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for adjusting beam weight based on identifying a hand blockage of one or more antenna arrays. The UE 115 may update beam weights may control the transmitter 415 to transmit communications using the updating beam weights, rather than switching beams, which may thereby avoid latency and control channel overhead.

Figure 5:
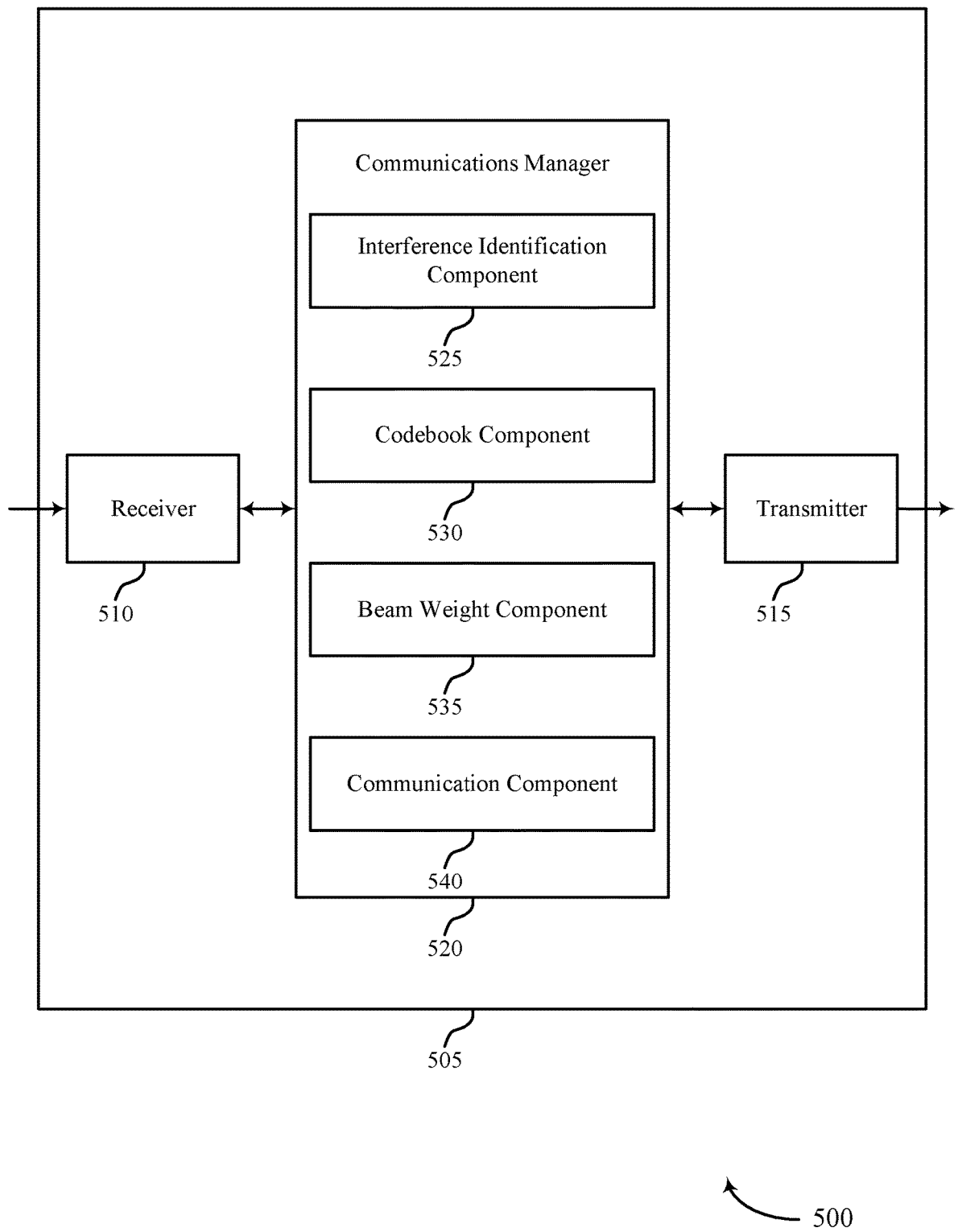
FIG. 5 shows a block diagram of a device that supports techniques for dynamic beamforming mitigation of mmW blockages in accordance with various aspects of the present disclosure.

FIG. 5 shows a block diagram 500 of a device 505 that supports techniques for dynamic beamforming mitigation of mmW blockages in accordance with various aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for dynamic beamforming mitigation of mmW blockages). Information may be passed on to other components of the device 505. The receiver 510 may utilize a single antenna or multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for dynamic beamforming mitigation of mmW blockages). In some examples, the transmitter 515 may be co-located with a receiver 510 in a transceiver component. The transmitter 515 may utilize a single antenna or multiple antennas.

The device 505, or various components thereof, may be an example of means for performing various aspects of techniques for dynamic beamforming mitigation of mmW blockages as described herein. For example, the communications manager 520 may include an interference identification component 525, a codebook component 530, a beam weight component 535, a communication component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The interference identification component 525 may be configured as or otherwise support a means for identifying a blockage corresponding to one or more antenna arrays of multiple antenna arrays based on using a first set of beam weights corresponding to a static beamforming codebook of the one or more antenna arrays. The codebook component 530 may be configured as or otherwise support a means for switching from a static beamforming codebook-based beam weight determination to a dynamic beamforming codebook-based beam weight determination. The beam weight component 535 may be configured as or otherwise support a means for determining a second set of beam weights to use for the one or more antenna arrays based on the dynamic beamforming codebook-based beam weight determination. The communication component 540 may be configured as or otherwise support a means for communicating using the one or more antenna arrays according to the second set of beam weights.

Figure 6:
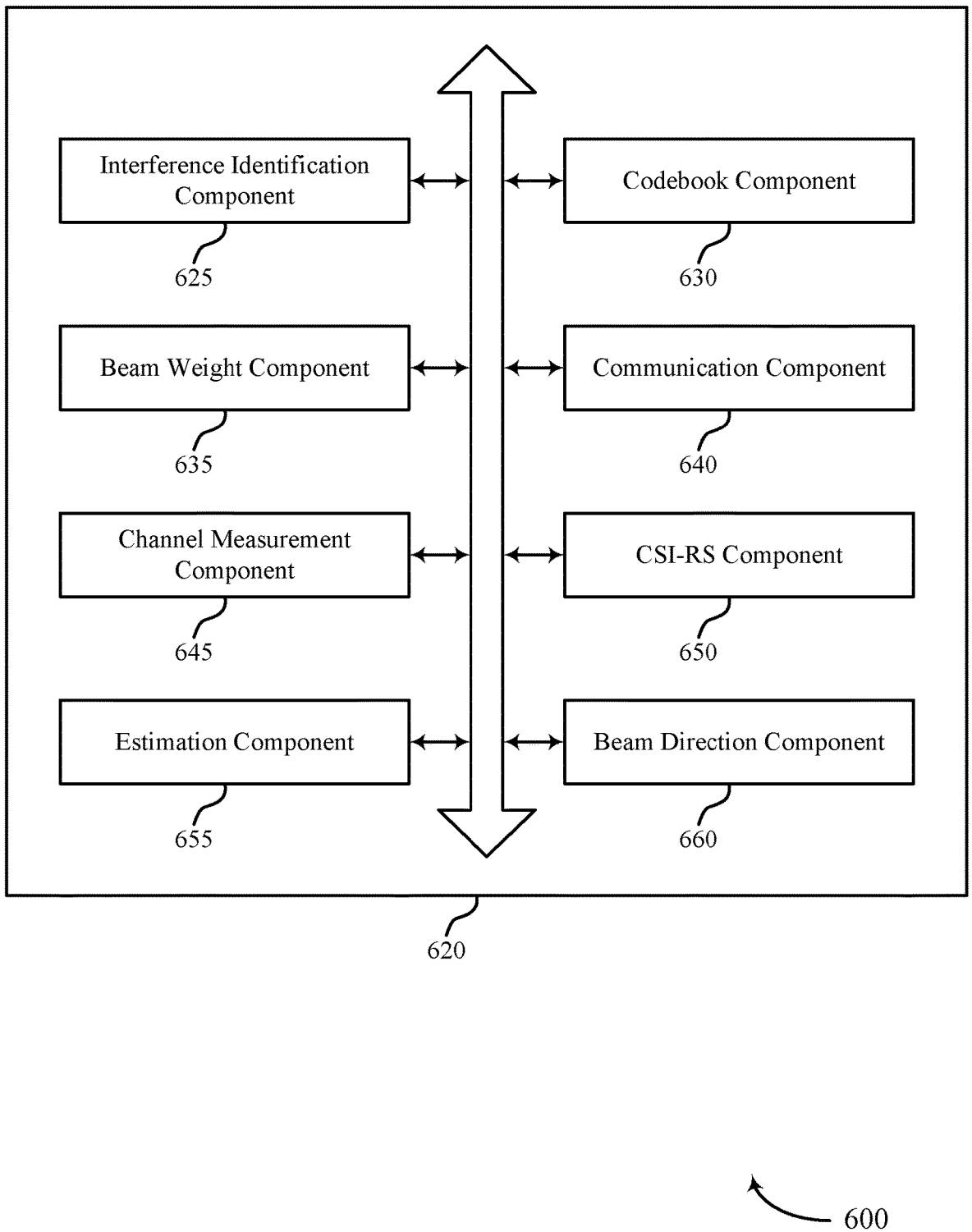
FIG. 6 shows a block diagram of a communications manager that supports techniques for dynamic beamforming mitigation of mmW blockages in accordance with various aspects of the present disclosure.

FIG. 6 shows a block diagram 600 of a communications manager 620 that supports techniques for dynamic beamforming mitigation of mmW blockages in accordance with various aspects of the present disclosure. The communications manager 620 may be an example of aspects of a communications manager 420, a communications manager 520, or both, as described herein. The communications manager 620, or various components thereof, may be an example of means for performing various aspects of techniques for dynamic beamforming mitigation of mmW blockages as described herein. For example, the communications manager 620 may include an interference identification component 625, a codebook component 630, a beam weight component 635, a communication component 640, a channel measurement component 645, a CSI-RS component 650, an estimation component 655, a beam direction component 660, or any combination thereof. Each of these components may communicate, directly or indirectly, with one another (e.g., via one or more buses).

The communications manager 620 may support wireless communications at a UE in accordance with examples as disclosed herein. The interference identification component 625 may be configured as or otherwise support a means for identifying a blockage corresponding to one or more antenna arrays of multiple antenna arrays based on using a first set of beam weights corresponding to a static beamforming codebook of the one or more antenna arrays. The codebook component 630 may be configured as or otherwise support a means for switching from a static beamforming codebook-based beam weight determination to a dynamic beamforming codebook-based beam weight determination. The beam weight component 635 may be configured as or otherwise support a means for determining a second set of beam weights to use for the one or more antenna arrays based on the dynamic beamforming codebook-based beam weight determination. The communication component 640 may be configured as or otherwise support a means for communicating using the one or more antenna arrays according to the second set of beam weights.

In some examples, the channel measurement component 645 may be configured as or otherwise support a means for measuring one or more channel conditions using a set of aperiodic CSI-RS symbols, where determining the second set of beam weights is based on measuring the one or more channel conditions. In some examples, the set of aperiodic CSI-RS symbols are based on an allocation by a base station.

In some examples, the CSI-RS component 650 may be configured as or otherwise support a means for selecting a subset of the set of aperiodic CSI-RS symbols based on a dynamic beamforming codebook associated with the dynamic beamforming codebook-based beam weight determination. In some examples, the estimation component 655 may be configured as or otherwise support a means for estimating one or more beam weights corresponding to each aperiodic CSI-RS symbols of the subset, where determining the second set of beam weights is based on the estimated one or more beam weights.

In some examples, to support estimating the one or more beam weights, the estimation component 655 may be configured as or otherwise support a means for estimating a signal strength of the subset of aperiodic CSI-RS symbols. In some examples, to support estimating the one or more beam weights, the beam direction component 660 may be configured as or otherwise support a means for determining a set of beam directions based on the estimated signal strength.

In some examples, the estimation component 655 may be configured as or otherwise support a means for estimating a phase shift of the one or more beam weights based on the subset of aperiodic CSI-RS symbols, where estimating the one or more beam weights is based on estimating the phase shift.

In some examples, the estimation component 655 may be configured as or otherwise support a means for estimating an amplitude control adaptation of the one or more beam weights based on the subset of aperiodic CSI-RS symbols, where estimating the one or more beam weights is based on estimating the amplitude control adaptation.

In some examples, the dynamic beamforming codebook corresponds to a fixed set of phase shifter and amplitude control adaptations that are loaded from a slow memory of the UE. In some examples, a quantity of the amplitude control adaptations satisfy a second threshold level of a size of the one or more antenna arrays.

In some examples, the CSI-RS component 650 may be configured as or otherwise support a means for transmitting a request for a number and location of aperiodic CSI-RS symbols. In some examples, the CSI-RS component 650 may be configured as or otherwise support a means for receiving the set of aperiodic CSI-RS symbols, where measuring the one or more channel conditions is based on receiving the set of aperiodic CSI-RS symbols.

In some examples, the interference identification component 625 may be configured as or otherwise support a means for detecting, by one or more sensors, a condition of an environment, where identifying the blockage is based on detecting the condition using the one or more sensors.

In some examples, the one or more sensors include a radar sensor, a FMCW radar sensor, a LIDAR sensor, an accelerometer, a tachometer, a proximity sensor, a gyroscope, a magnetometer, a light sensor, a touch sensor, or a combination thereof. In some examples, the blockage is a hand or body of a user holding the UE.

In some examples, the interference identification component 625 may be configured as or otherwise support a means for performing a machine learning analysis of one or more conditions in an environment, where identifying the blockage is based on performing the machine learning analysis on a accumulated history of at least one of beam management reports including TCI states and associated RSRPs, UE feedback on CQI, RI and PMI used at a base station, base station messages, or HARQ messages, or a combination thereof.

In some examples, the beam weight component 635 may be configured as or otherwise support a means for applying the determined second set of beam weights to the multiple antenna arrays based on the dynamic beamforming codebook-based beam weight determination.

In some examples, the channel measurement component 645 may be configured as or otherwise support a means for determining that a signal strength associated with the one or more antenna arrays satisfies a signal strength threshold, where identifying the blockage is based on determining that the signal strength satisfies the signal strength threshold. In some examples, the CSI-RS component 650 may be configured as or otherwise support a means for transmitting a request to receive one or more aperiodic CSI-RS symbols based on the determining. In some examples, the signal strength threshold includes a RSRP corresponding to the first set of beam weights.

In some examples, the static beamforming codebook corresponds to a fixed set of phase shifter and amplitude control adaptations that are based on a fast memory of the UE. In some examples, a quantity of the amplitude control adaptations satisfy a first threshold level of a size of the one or more antenna arrays. In some examples, the UE operates in a mmW radio frequency spectrum band greater than 24.25 gigahertz.

Figure 7:
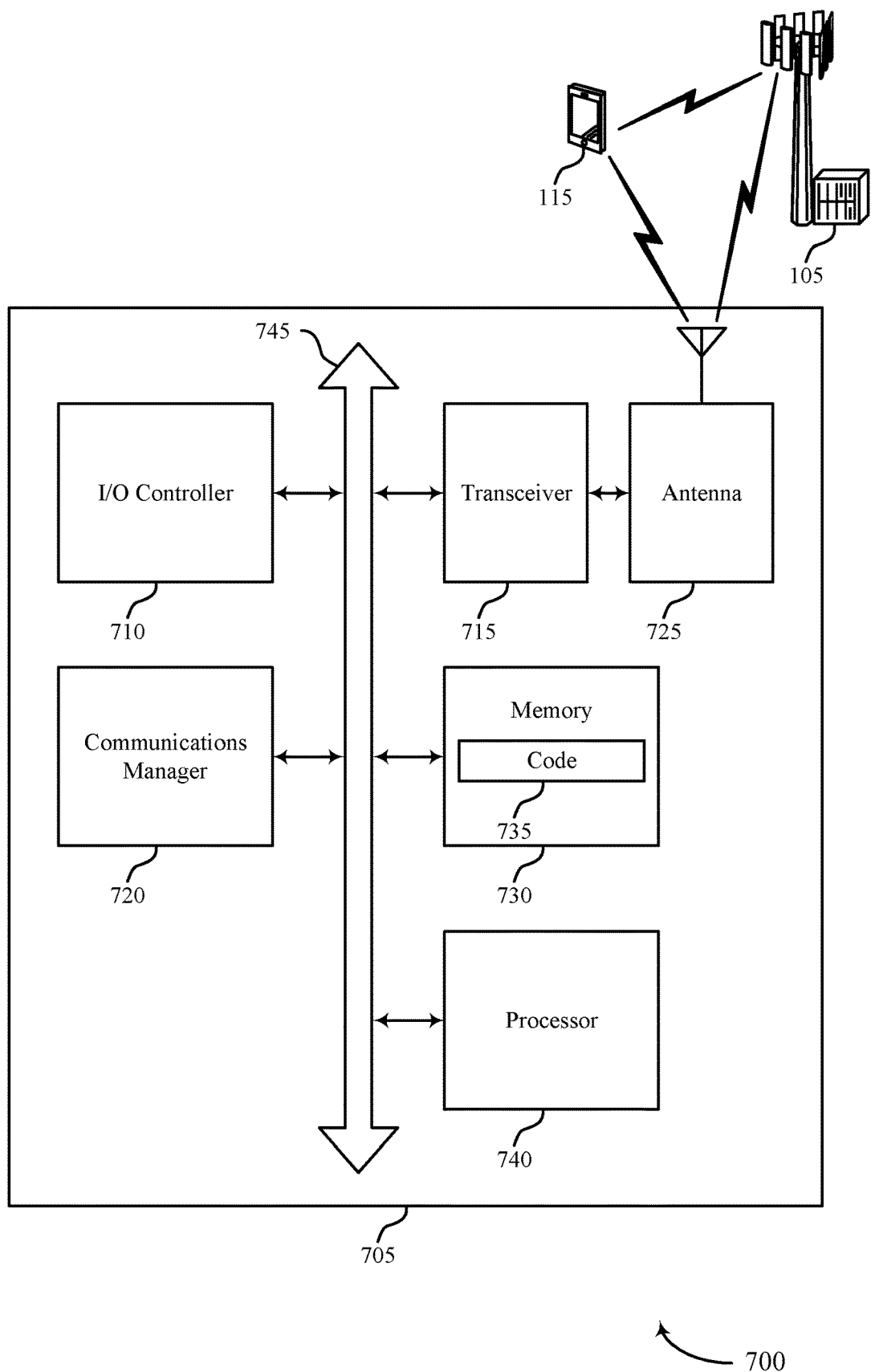
FIG. 7 shows a diagram of a system including a device that supports techniques for dynamic beamforming mitigation of mmW blockages in accordance with various aspects of the present disclosure.

FIG. 7 shows a diagram of a system 700 including a device 705 that supports techniques for dynamic beamforming mitigation of mmW blockages in accordance with various aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for dynamic beamforming mitigation of mmW blockages). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for identifying a blockage corresponding to one or more antenna arrays of multiple antenna arrays based on using a first set of beam weights corresponding to a static beamforming codebook of the one or more antenna arrays. The communications manager 720 may be configured as or otherwise support a means for switching from a static beamforming codebook-based beam weight determination to a dynamic beamforming codebook-based beam weight determination. The communications manager 720 may be configured as or otherwise support a means for determining a second set of beam weights to use for the one or more antenna arrays based on the dynamic beamforming codebook-based beam weight determination. The communications manager 720 may be configured as or otherwise support a means for communicating using the one or more antenna arrays according to the second set of beam weights.

By including or configuring the communications manager 720 in accordance with examples as described herein, the device 705 may support techniques for mitigating near-field and far-field interference by using a dynamic codebook to updated beam weights. The updated beam weights may thereby tailor beams to avoid reflection from a hand or body of a user holding the UE 115, and the UE 115 may therefore improve communication efficiency by avoiding latency from beam switching.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for dynamic beamforming mitigation of mmW blockages as described herein, or the processor 740 and the memory 730 may be otherwise configured to perform or support such operations.

Figure 8:
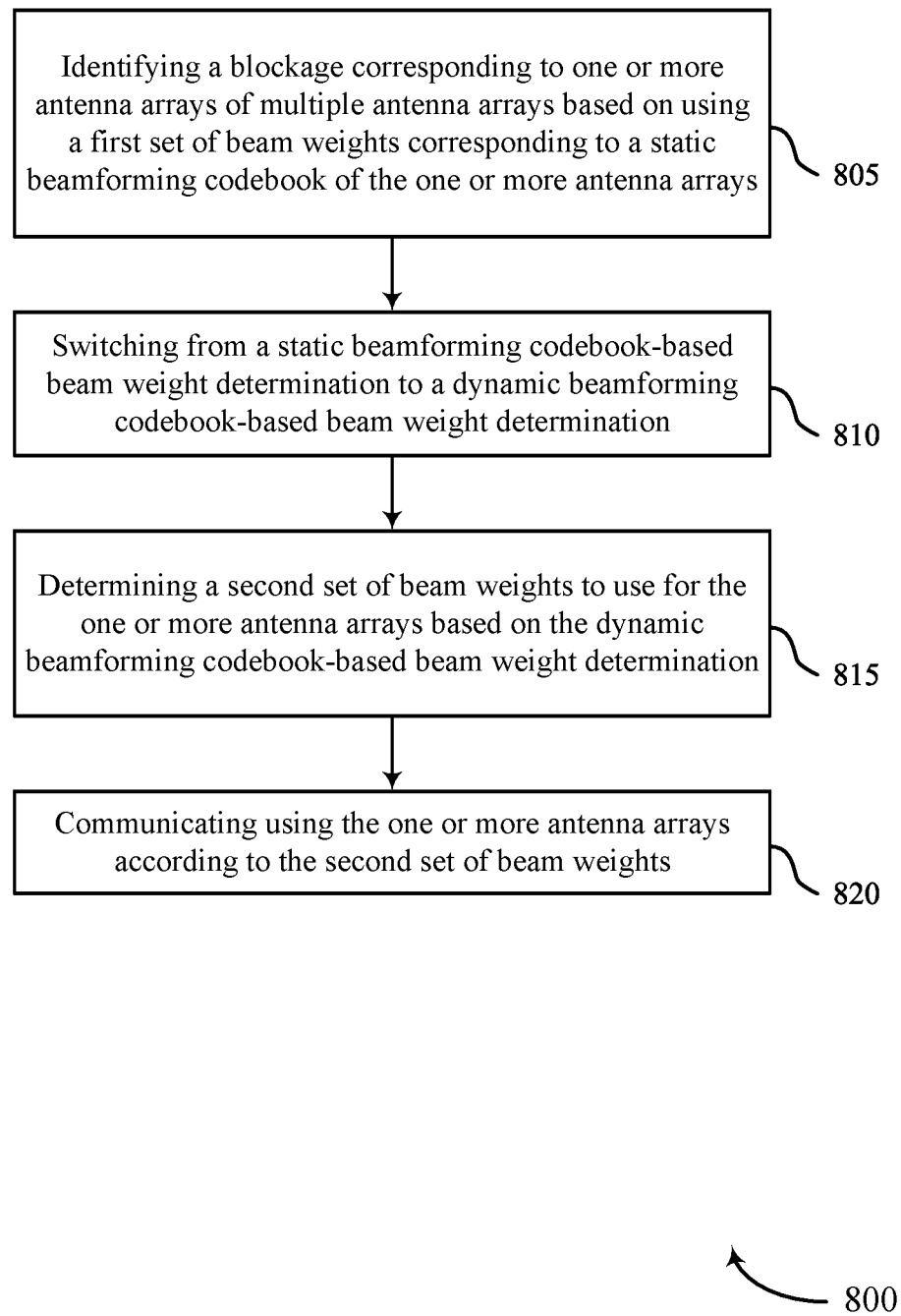
FIG. 8 shows a flowchart illustrating a method that supports techniques for dynamic beamforming mitigation of mmW blockages in accordance with various aspects of the present disclosure.

FIG. 8 shows a flowchart illustrating a method 800 that supports techniques for dynamic beamforming mitigation of mmW blockages in accordance with various aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include identifying a blockage corresponding to one or more antenna arrays of multiple antenna arrays based on using a first set of beam weights corresponding to a static beamforming codebook of the one or more antenna arrays. The operations of 805 may be performed in accordance with examples as disclosed herein. In some examples, aspects of the operations of 805 may be performed by an interference identification component 625 as described with reference to FIG. 6.

At 810, the method may include switching from a static beamforming codebook-based beam weight determination to a dynamic beamforming codebook-based beam weight determination. The operations of 810 may be performed in accordance with examples as disclosed herein. In some examples, aspects of the operations of 810 may be performed by a codebook component 630 as described with reference to FIG. 6.

At 815, the method may include determining a second set of beam weights to use for the one or more antenna arrays based on the dynamic beamforming codebook-based beam weight determination. The operations of 815 may be performed in accordance with examples as disclosed herein. In some examples, aspects of the operations of 815 may be performed by a beam weight component 635 as described with reference to FIG. 6.

At 820, the method may include communicating using the one or more antenna arrays according to the second set of beam weights. The operations of 820 may be performed in accordance with examples as disclosed herein. In some examples, aspects of the operations of 820 may be performed by a communication component 640 as described with reference to FIG. 6.

Figure 9:
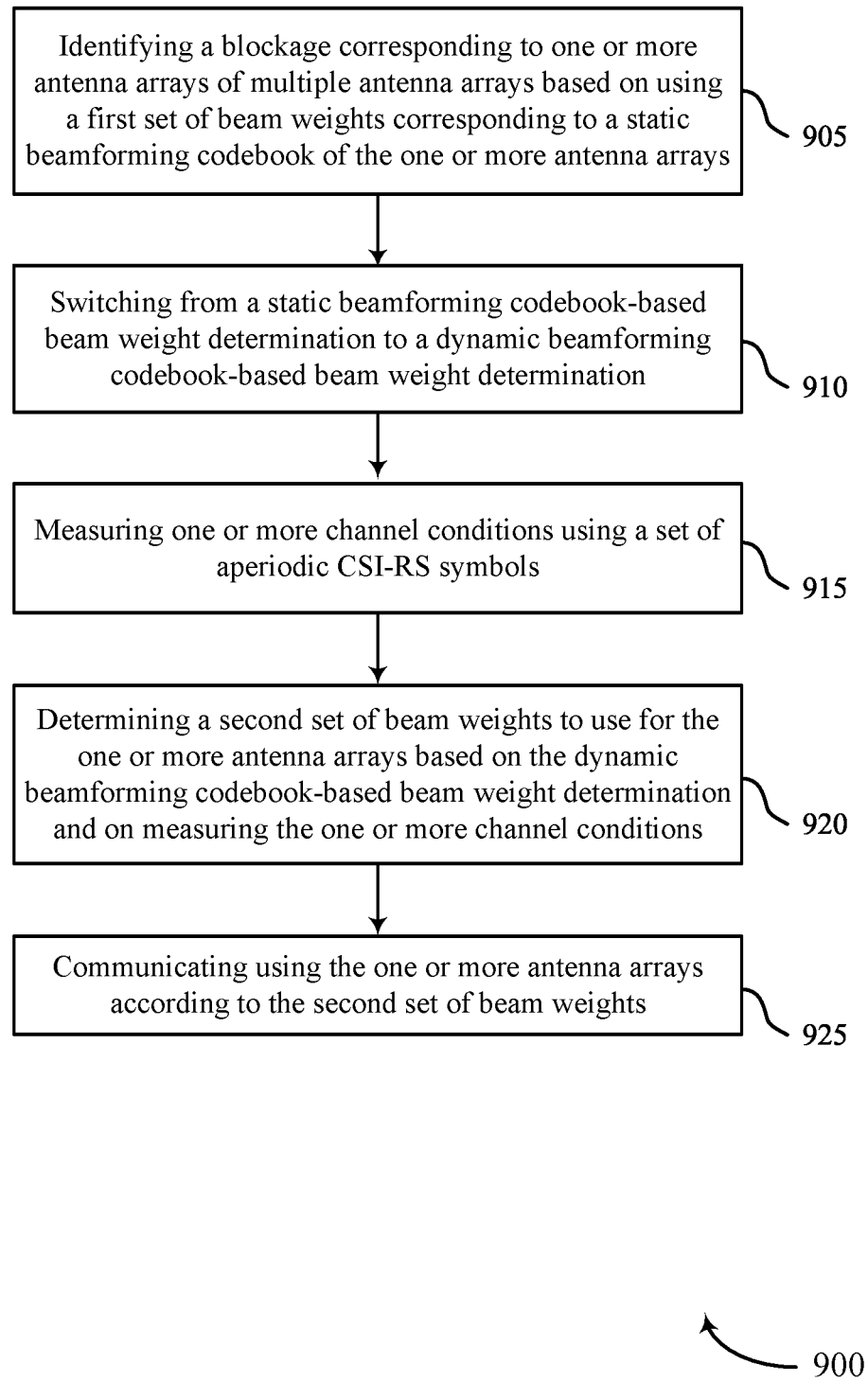
FIG. 9 shows a flowchart illustrating a method that supports techniques for dynamic beamforming mitigation of mmW blockages in accordance with various aspects of the present disclosure.

FIG. 9 shows a flowchart illustrating a method 900 that supports techniques for dynamic beamforming mitigation of mmW blockages in accordance with various aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include identifying a blockage corresponding to one or more antenna arrays of multiple antenna arrays based on using a first set of beam weights corresponding to a static beamforming codebook of the one or more antenna arrays. The operations of 905 may be performed in accordance with examples as disclosed herein. In some examples, aspects of the operations of 905 may be performed by an interference identification component 625 as described with reference to FIG. 6.

At 910, the method may include switching from a static beamforming codebook-based beam weight determination to a dynamic beamforming codebook-based beam weight determination. The operations of 910 may be performed in accordance with examples as disclosed herein. In some examples, aspects of the operations of 910 may be performed by a codebook component 630 as described with reference to FIG. 6.

At 915, the method may include measuring one or more channel conditions using a set of aperiodic CSI-RS symbols. The operations of 915 may be performed in accordance with examples as disclosed herein. In some examples, aspects of the operations of 915 may be performed by a channel measurement component 645 as described with reference to FIG. 6.

At 920, the method may include determining a second set of beam weights to use for the one or more antenna arrays based on the dynamic beamforming codebook-based beam weight determination and on measuring the one or more channel conditions. The operations of 920 may be performed in accordance with examples as disclosed herein. In some examples, aspects of the operations of 920 may be performed by a beam weight component 635 as described with reference to FIG. 6.

At 925, the method may include communicating using the one or more antenna arrays according to the second set of beam weights. The operations of 925 may be performed in accordance with examples as disclosed herein. In some examples, aspects of the operations of 925 may be performed by a communication component 640 as described with reference to FIG. 6.

Figure 10:
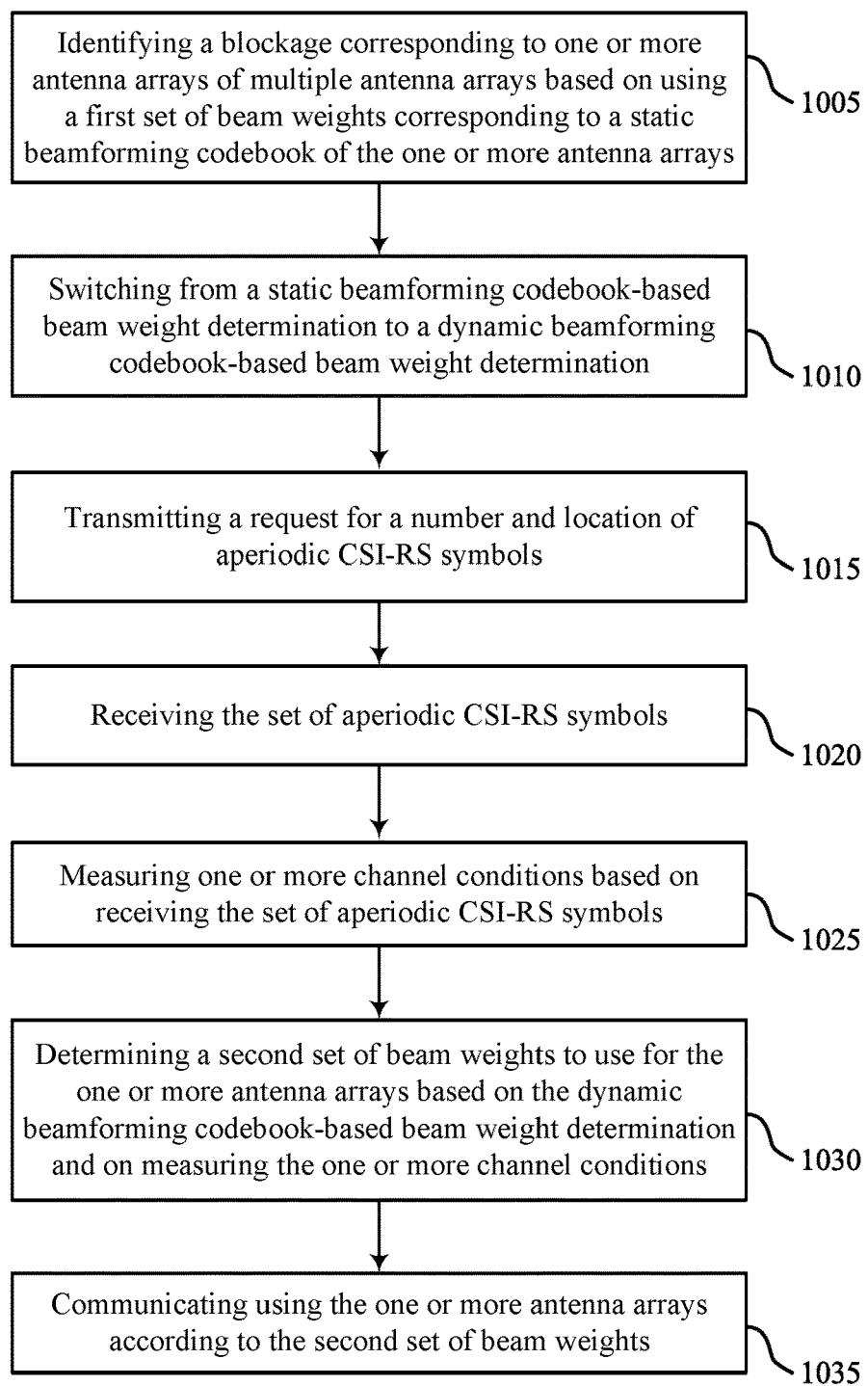
FIG. 10 shows a flowchart illustrating a method that supports techniques for dynamic beamforming mitigation of mmW blockages in accordance with various aspects of the present disclosure.

FIG. 10 shows a flowchart illustrating a method 1000 that supports techniques for dynamic beamforming mitigation of mmW blockages in accordance with various aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include identifying a blockage corresponding to one or more antenna arrays of multiple antenna arrays based on using a first set of beam weights corresponding to a static beamforming codebook of the one or more antenna arrays. The operations of 1005 may be performed in accordance with examples as disclosed herein. In some examples, aspects of the operations of 1005 may be performed by an interference identification component 625 as described with reference to FIG. 6.

At 1010, the method may include switching from a static beamforming codebook-based beam weight determination to a dynamic beamforming codebook-based beam weight determination. The operations of 1010 may be performed in accordance with examples as disclosed herein. In some examples, aspects of the operations of 1010 may be performed by a codebook component 630 as described with reference to FIG. 6.

At 1015, the method may include transmitting a request for a number and location of aperiodic CSI-RS symbols. The operations of 1015 may be performed in accordance with examples as disclosed herein. In some examples, aspects of the operations of 1015 may be performed by a CSI-RS component 650 as described with reference to FIG. 6.

At 1020, the method may include receiving the set of aperiodic CSI-RS symbols. The operations of 1020 may be performed in accordance with examples as disclosed herein. In some examples, aspects of the operations of 1020 may be performed by a CSI-RS component 650 as described with reference to FIG. 6.

At 1025, the method may include measuring one or more channel conditions based on receiving the set of aperiodic CSI-RS symbols. The operations of 1025 may be performed in accordance with examples as disclosed herein. In some examples, aspects of the operations of 1025 may be performed by a channel measurement component 645 as described with reference to FIG. 6.

At 1030, the method may include determining a second set of beam weights to use for the one or more antenna arrays based on the dynamic beamforming codebook-based beam weight determination and on measuring the one or more channel conditions. The operations of 1030 may be performed in accordance with examples as disclosed herein. In some examples, aspects of the operations of 1030 may be performed by a beam weight component 635 as described with reference to FIG. 6.

At 1035, the method may include communicating using the one or more antenna arrays according to the second set of beam weights. The operations of 1035 may be performed in accordance with examples as disclosed herein. In some examples, aspects of the operations of 1035 may be performed by a communication component 640 as described with reference to FIG. 6.

The following provides an overview of aspects of the present disclosure:

Aspect 1: A method for wireless communications at a UE, comprising: identifying a blockage corresponding to one or more antenna arrays of a plurality of antenna arrays based at least in part on using a first set of beam weights corresponding to a static beamforming codebook of the one or more antenna arrays; switching from a static beamforming codebook-based beam weight determination to a dynamic beamforming codebook-based beam weight determination; determining a second set of beam weights to use for the one or more antenna arrays based at least in part on the dynamic beamforming codebook-based beam weight determination; communicating using the one or more antenna arrays according to the second set of beam weights.

Aspect 2: The method of aspect 1, further comprising: measuring one or more channel conditions using a set of aperiodic channel state information reference signal symbols, wherein determining the second set of beam weights is based at least in part on measuring the one or more channel conditions.

Aspect 3: The method of aspect 2, further comprising: selecting a subset of the set of aperiodic channel state information reference signal symbols based at least in part on a dynamic beamforming codebook associated with the dynamic beamforming codebook-based beam weight determination; and estimating one or more beam weights corresponding to each aperiodic channel state information reference signal symbols of the subset, wherein determining the second set of beam weights is based at least in part on the estimated one or more beam weights.

Aspect 4: The method of aspect 3, wherein estimating the one or more beam weights comprises: estimating a signal strength of the subset of aperiodic channel state information reference signal symbols; and determining a set of beam directions based at least in part on the estimated signal strength.

Aspect 5: The method of any of aspects 3 through 4, further comprising: estimating a phase shift of the one or more beam weights based at least in part on the subset of aperiodic channel state information reference signal symbols, wherein estimating the one or more beam weights is based at least in part on estimating the phase shift.

Aspect 6: The method of any of aspects 3 through 5, further comprising: estimating an amplitude control adaptation of the one or more beam weights based at least in part on the subset of aperiodic channel state information reference signal symbols, wherein estimating the one or more beam weights is based at least in part on estimating the amplitude control adaptation.

Aspect 7: The method of any of aspects 3 through 6, wherein: the dynamic beamforming codebook corresponds to a fixed set of phase shifter and amplitude control adaptations that are loaded from a slow memory of the UE; and a quantity of the amplitude control adaptations satisfy a second threshold level of a size of the one or more antenna arrays.

Aspect 8: The method of any of aspects 2 through 7, wherein the set of aperiodic channel state information reference signal symbols are based at least in part on an allocation by a base station.

Aspect 9: The method of any of aspects 2 through 8, further comprising: transmitting a request for a number and location of aperiodic channel state information reference signal symbols; and receiving the set of aperiodic channel state information reference signal symbols, wherein measuring the one or more channel conditions is based at least in part on receiving the set of aperiodic channel state information reference signal symbols.

Aspect 10: The method of any of aspects 1 through 9, further comprising: detecting, by one or more sensors, a condition of an environment, wherein identifying the blockage is based at least in part on detecting the condition using the one or more sensors.

Aspect 11: The method of aspect 10, wherein the one or more sensors include a radar sensor, a frequency modulated continuous wave (FMCW) radar sensor, a light detection and ranging (LIDAR) sensor, an accelerometer, a tachometer, a proximity sensor, a gyroscope, a magnetometer, a light sensor, a touch sensor, or a combination thereof.

Aspect 12: The method of aspect 11, wherein the blockage is a hand of a user or body holding the UE.

Aspect 13: The method of any of aspects 1 through 12, further comprising: performing a machine learning analysis of one or more conditions in an environment, wherein identifying the blockage is based at least in part on performing the machine learning analysis by accumulating a history of at least one of beam management reports including transmission configuration indicator (TCI) states and associated reference signal received powers (RSRPs), UE feedback on channel quality indicator (CQI), rank indicator (RI) and precoding matrix indicator (PMI) used at a base station, base station messages, or hybrid automatic repeat request (HARQ) messages, or a combination thereof.

Aspect 14: The method of any of aspects 1 through 13, further comprising: applying the determined second set of beam weights to the plurality of antenna arrays based at least in part on the dynamic beamforming codebook-based beam weight determination.

Aspect 15: The method of any of aspects 1 through 14, further comprising: determining that a signal strength associated with the one or more antenna arrays satisfies a signal strength threshold, wherein identifying the blockage is based at least in part on determining that the signal strength satisfies the signal strength threshold; and transmitting a request to receive one or more aperiodic channel state information reference signal symbols based at least in part on the determining.

Aspect 16: The method of aspect 15, wherein the signal strength threshold includes a reference signal received power (RSRP) corresponding to the first set of beam weights.

Aspect 17: The method of any of aspects 1 through 16, wherein: the static beamforming codebook corresponds to a fixed set of phase shifter and amplitude control adaptations that are based at least in part on a fast memory of the UE; and a quantity of the amplitude control adaptations satisfy a first threshold level of a size of the one or more antenna arrays.

Aspect 18: The method of any of aspects 1 through 17, wherein the UE operates in a millimeter wave radio frequency spectrum band greater than 24.25 gigahertz.

Aspect 19: An apparatus for wireless communications at a UE, comprising a processor; memory coupled with the processor; and instructions stored in the memory and executable by the processor to cause the apparatus to perform a method of any of aspects 1 through 18.

Aspect 20: An apparatus for wireless communications at a UE, comprising at least one means for performing a method of any of aspects 1 through 18.

Aspect 21: A non-transitory computer-readable medium storing code for wireless communications at a UE, the code comprising instructions executable by a processor to perform a method of any of aspects 1 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   communicating using one or more antenna arrays of a plurality of antenna arrays of the UE according to a first set of beam weights corresponding to a static beamforming codebook of the UE;
   switching from the static beamforming codebook to a dynamic beamforming codebook of the UE based at least in part on an environmental condition associated with the one or more antenna arrays, a signal strength associated with the one or more antenna arrays, or both;
   transmitting a request to receive one or more aperiodic channel state information reference signals based at least in part on switching from the static beamforming codebook to the dynamic beamforming codebook; and
   communicating using the one or more antenna arrays according to a second set of beam weights corresponding to the dynamic beamforming codebook, wherein the second set of beam weights is determined based at least in part on the one or more aperiodic channel state information reference signals.

2. The method of claim 1, further comprising:
   measuring one or more channel conditions based on the one or more aperiodic channel state information reference signals, wherein the second set of beam weights is determined based at least in part on the one or more channel conditions.

3. The method of claim 2, further comprising:
   selecting a subset of the one or more aperiodic channel state information reference signals based at least in part on the dynamic beamforming codebook; and
   estimating one or more beam weights corresponding to each aperiodic channel state information reference signal of the subset, wherein the second set of beam weights is determined based at least in part on the one or more beam weights.

4. The method of claim 3, wherein estimating the one or more beam weights comprises:
   estimating the signal strength of the subset of the one or more aperiodic channel state information reference signals; and
   determining a set of beam directions based at least in part on the signal strength.

5. The method of claim 3, further comprising:
   estimating a phase shift of the subset of the one or more aperiodic channel state information reference signals, wherein estimating the one or more beam weights is based at least in part on the phase shift.

6. The method of claim 3, further comprising:
   estimating an amplitude control adaptation based at least in part on the subset of the one or more aperiodic channel state information reference signals, wherein estimating the one or more beam weights is based at least in part on the amplitude control adaptation.

7. The method of claim 3, wherein:
   the dynamic beamforming codebook corresponds to a fixed set of phase shift and amplitude control adaptations that are loaded from memory; and
   a quantity of phase shift and amplitude control adaptations in the fixed set satisfies a threshold associated with a size of the one or more antenna arrays.

8. The method of claim 2, wherein transmission of the one or more aperiodic channel state information reference signals is scheduled by a network entity.

9. The method of claim 2, further comprising:
transmitting a request for a number and location of aperiodic channel state information reference signal symbols; and
receiving the one or more aperiodic channel state information reference signals in accordance with the request, wherein the one or more channel conditions are measured based at least in part on the one or more aperiodic channel state information reference signals.

10. The method of claim 1, further comprising:
detecting the environmental condition using one or more sensors of the UE.

11. The method of claim 10, wherein the one or more sensors include a radar sensor, a frequency modulated continuous wave (FMCW) radar sensor, a light detection and ranging (LIDAR) sensor, an accelerometer, a tachometer, a proximity sensor, a gyroscope, a magnetometer, a light sensor, a touch sensor, or a combination thereof.

12. The method of claim 1, wherein the environmental condition comprises a blockage corresponding to a hand or body of a user holding the UE.

13. The method of claim 1, further comprising:
applying the determined second set of beam weights to the plurality of antenna arrays based at least in part on the dynamic beamforming codebook.

14. The method of claim 1, further comprising:
determining that the signal strength associated with the one or more antenna arrays satisfies a signal strength threshold; and
transmitting the request to receive the one or more aperiodic channel state information reference signals based at least in part on the signal strength satisfying the signal strength threshold.

15. The method of claim 14, wherein the signal strength threshold includes a reference signal received power (RSRP) corresponding to the first set of beam weights.

16. The method of claim 1, wherein:
the static beamforming codebook corresponds to a fixed set of phase shift and amplitude control adaptations loaded from memory; and
a quantity of phase shift and amplitude control adaptations in the fixed set satisfies a threshold associated with a size of the one or more antenna arrays.

17. The method of claim 1, wherein the UE operates in a millimeter wave radio frequency spectrum band comprising frequencies greater than 24.25 gigahertz.

18. A method for wireless communications at a user equipment (UE), comprising:
communicating using one or more antenna arrays of a plurality of antenna arrays of the UE according to a first set of beam weights corresponding to a static beamforming codebook of the UE;
performing a machine learning analysis of one or more environmental conditions associated with the one or more antenna arrays, wherein the machine learning analysis is performed using an accumulated history of at least one beam management report including transmission configuration indicator (TCI) states and associated reference signal received powers (RSRPs), feedback on one or more of a channel quality indicator (CQI), a rank indicator (RI), or a precoding matrix indicator (PMI), one or more messages from a network entity, hybrid automatic repeat request (HARM) acknowledgement (ACK) feedback, or a combination thereof;
switching from the static beamforming codebook to a dynamic beamforming codebook of the UE based at least in part on a result of the machine learning analysis; and
communicating using the one or more antenna arrays according to a second set of beam weights corresponding to the dynamic beamforming codebook.

19. An apparatus for wireless communications at a user equipment (UE), comprising:
a processor;
memory coupled with the processor; and
instructions stored in the memory and executable by the processor to cause the apparatus to:
communicate using one or more antenna arrays of a plurality of antenna arrays of the UE according to a first set of beam weights corresponding to a static beamforming codebook of the UE;
switch from the static beamforming codebook to a dynamic beamforming codebook of the UE based at least in part on an environmental condition associated with the one or more antenna arrays, a signal strength associated with the one or more antenna arrays, or both;
transmit a request to receive one or more aperiodic channel state information reference signals based at least in part on switching from the static beamforming codebook to the dynamic beamforming codebook; and
communicate using the one or more antenna arrays according to a second set of beam weights corresponding to the dynamic beamforming codebook, wherein the second set of beam weights is determined based at least in part on the one or more aperiodic channel state information reference signals.

20. The apparatus of claim 19, wherein the instructions are further executable by the processor to cause the apparatus to:
measure one or more channel conditions based on the one or more aperiodic channel state information reference signals, wherein the second set of beam weights is determined based at least in part on the one or more channel conditions.

21. The apparatus of claim 20, wherein the instructions are further executable by the processor to cause the apparatus to:
select a subset of the one or more aperiodic channel state information reference signals based at least in part on the dynamic beamforming codebook; and
estimate one or more beam weights corresponding to each aperiodic channel state information reference signal of the subset, wherein the second set of beam weights is determined based at least in part on the one or more beam weights.

22. The apparatus of claim 21, wherein, to estimate the one or more beam weights, the instructions are executable by the processor to cause the apparatus to:
estimate the signal strength of the subset of the one or more aperiodic channel state information reference signals; and
determine a set of beam directions based at least in part on the signal strength.

23. The apparatus of claim 21, wherein the instructions are further executable by the processor to cause the apparatus to:
estimate a phase shift of the subset of the one or more aperiodic channel state information reference signals, wherein estimating the one or more beam weights is based at least in part on the phase shift.

24. The apparatus of claim 21, wherein the instructions are further executable by the processor to cause the apparatus to:
estimate an amplitude control adaptation based at least in part on the subset of the one or more aperiodic channel state information reference signals, wherein estimating the one or more beam weights is based at least in part on the amplitude control adaptation.

25. The apparatus of claim 21, wherein:
the dynamic beamforming codebook corresponds to a fixed set of phase shift and amplitude control adaptations that are loaded from memory; and
a quantity of phase shift and amplitude control adaptations in the fixed set satisfies a threshold associated with a size of the one or more antenna arrays.

26. The apparatus of claim 20, wherein transmission of the one or more aperiodic channel state information reference signals is scheduled by a network entity.

27. The apparatus of claim 20, wherein the instructions are further executable by the processor to cause the apparatus to:
transmit a request for a number and location of aperiodic channel state information reference signal symbols; and
receive the one or more aperiodic channel state information reference signals in accordance with the request, wherein the one or more channel conditions are measured based at least in part on the one or more aperiodic channel state information reference signals.

28. The apparatus of claim 19, wherein the instructions are further executable by the processor to cause the apparatus to:
detect the environmental condition using one or more sensors.

29. An apparatus for wireless communications at a user equipment (UE), comprising:
a processor;
memory coupled with the processor; and
instructions stored in the memory and executable by the processor to cause the apparatus to:
communicate using one or more antenna arrays of a plurality of antenna arrays of the UE according to a first set of beam weights corresponding to a static beamforming codebook of the UE;
perform a machine learning analysis of one or more environmental conditions associated with the one or more antenna arrays, wherein the machine learning analysis is performed using an accumulated history of at least one beam management report including transmission configuration indicator (TCI) states and associated reference signal received powers (RSRPs), feedback on one or more of a channel quality indicator (CQI), a rank indicator (RI), or a precoding matrix indicator (PMI), one or more messages from a network entity, hybrid automatic repeat request (HARQ) acknowledgement (ACK) feedback, or a combination thereof;
switch from the static beamforming codebook to a dynamic beamforming codebook of the UE based at least in part on a result of the machine learning analysis; and
communicate using the one or more antenna arrays according to a second set of beam weights corresponding to the dynamic beamforming codebook.

* * * * *